(12) United States Patent
Philippin (10) Patent No.: US 10,286,468 B2
(45) Date of Patent: May 14, 2019

(54) METHOD OF LOADING AND UNLOADING A WORKPIECE WITH INTERNAL GEARING, AND LOADING AND UNLOADING DEVICE

(71) Applicant: GLEASON-PFAUTER MASCHINENFABRIK GMBH, Ludwigsburg (DE)

(72) Inventor: Matthias Philippin, Rutesheim (DE)

(73) Assignee: GLEASON-PFAUTER MASCHINEFABRIK GMBH, Ludwigsburg (DE)

( * ) Notice: Subject to any disclaimer, the term of this patent is extended or adjusted under 35 U.S.C. 154(b) by 273 days.

(21) Appl. No.: 15/101,565

(22) PCT Filed: Nov. 6, 2014

(86) PCT No.: PCT/EP2014/002976
§ 371 (c)(1),
(2) Date: Jun. 3, 2016

(87) PCT Pub. No.: WO2015/090489
PCT Pub. Date: Jun. 25, 2015

(65) Prior Publication Data
US 2017/0014924 A1    Jan. 19, 2017

(30) Foreign Application Priority Data
Dec. 17, 2013   (DE) ........................ 10 2013 021 184

(51) Int. Cl.
*B23F 23/04*    (2006.01)
*B23F 19/10*    (2006.01)
(Continued)

(52) U.S. Cl.
CPC .............. *B23F 23/04* (2013.01); *B23F 19/00* (2013.01); *B23F 19/10* (2013.01); *B23Q 7/04* (2013.01);
(Continued)

(58) Field of Classification Search
CPC . Y10T 409/100795; Y10T 409/100954; Y10T 409/109699; Y10T 409/10–109699; B23F 23/04
(Continued)

(56) References Cited

U.S. PATENT DOCUMENTS 2,257,195 A * 9/1941 Rovick ................... B23F 19/02
                                                                                                           409/31
2,504,578 A * 4/1950 Pelphrey ................. B23F 19/06
                                                                                                           409/33
(Continued)

FOREIGN PATENT DOCUMENTS

DE          10258549 A1    5/2004
EP           1724046 A1    11/2006

OTHER PUBLICATIONS

Search Report from German Patent and Trademark Office for DE 102013021184.0, dated Mar. 18, 2014, 5 pgs.
(Continued)

*Primary Examiner* — Erica E Cadugan
(74) *Attorney, Agent, or Firm* — Robert L. McDowell (57) ABSTRACT

The invention relates to a method for loading and unloading an internally toothed workpiece or a workpiece that is to be provided with internal toothing into/out of a clamping position, in which the workpiece, which is held by a retaining device, is brought into the clamping position by means of a conveying movement so that said workpiece, when clamped, has internal toothing cut by a gear cutting tool that occupies a cutting chamber and, after cutting, said work-
(Continued)

piece, which is held by the retaining device, is returned from the clamping position in a return movement, wherein, prior to cutting, the retaining device is permitted to carry out an evasive movement that is different from the return movement/reverse conveying movement and that frees the cutting chamber, or the cutting chamber is already kept free of the retaining device as soon as the clamping position is reached.

11 Claims, 8 Drawing Sheets

(51) Int. Cl.
    *B23F 17/00*     (2006.01)
    *B23F 15/00*     (2006.01)
    *B23Q 7/04*     (2006.01)
    *B23F 19/00*     (2006.01)

(52) U.S. Cl.
    CPC .......... *B23Q 7/043* (2013.01); *Y10T 29/5176* (2015.01); *Y10T 409/100795* (2015.01); *Y10T 409/10795* (2015.01); *Y10T 409/100954* (2015.01); *Y10T 409/101113* (2015.01); *Y10T 409/109699* (2015.01)

(58) Field of Classification Search
    USPC ................................................ 409/6–7, 1–62
    See application file for complete search history.

(56) References Cited

U.S. PATENT DOCUMENTS

| | | | | |
|---|---|---|---|---|
| 2,906,177 A | * | 9/1959 | Gates ...................... | B23F 23/04 409/6 |
| 3,714,740 A | | 2/1973 | Steinhardt | |
| 3,762,270 A | * | 10/1973 | Anthony ................. | B23F 23/04 409/7 |
| 4,205,834 A | * | 6/1980 | Demuth .................. | B23F 23/12 409/11 |
| 4,597,155 A | | 7/1986 | Garnett et al. | |
| 2006/0257221 A1 | | 11/2006 | Taki et al. | |

OTHER PUBLICATIONS

International Search Report and Written Opinion for PCT/EP2014/002976, ISA/EPO, dated May 4 2015, 11 pages.

* cited by examiner

METHOD OF LOADING AND UNLOADING A WORKPIECE WITH INTERNAL GEARING, AND LOADING AND UNLOADING DEVICE

The invention relates to a method for loading and unloading an internally toothed workpiece or a workpiece that is to be provided with internal toothing into/out of a clamping position, in which the workpiece, which is held by a retaining device, is brought into the clamping position by means of a conveying movement so that said workpiece, when clamped, has internal toothing cut by a gear cutting tool that occupies a cutting chamber and, after cutting, said workpiece, which is held by the retaining device, is returned from the clamping position in a return movement. The invention further relates to a loading and unloading device.

Figure 4:
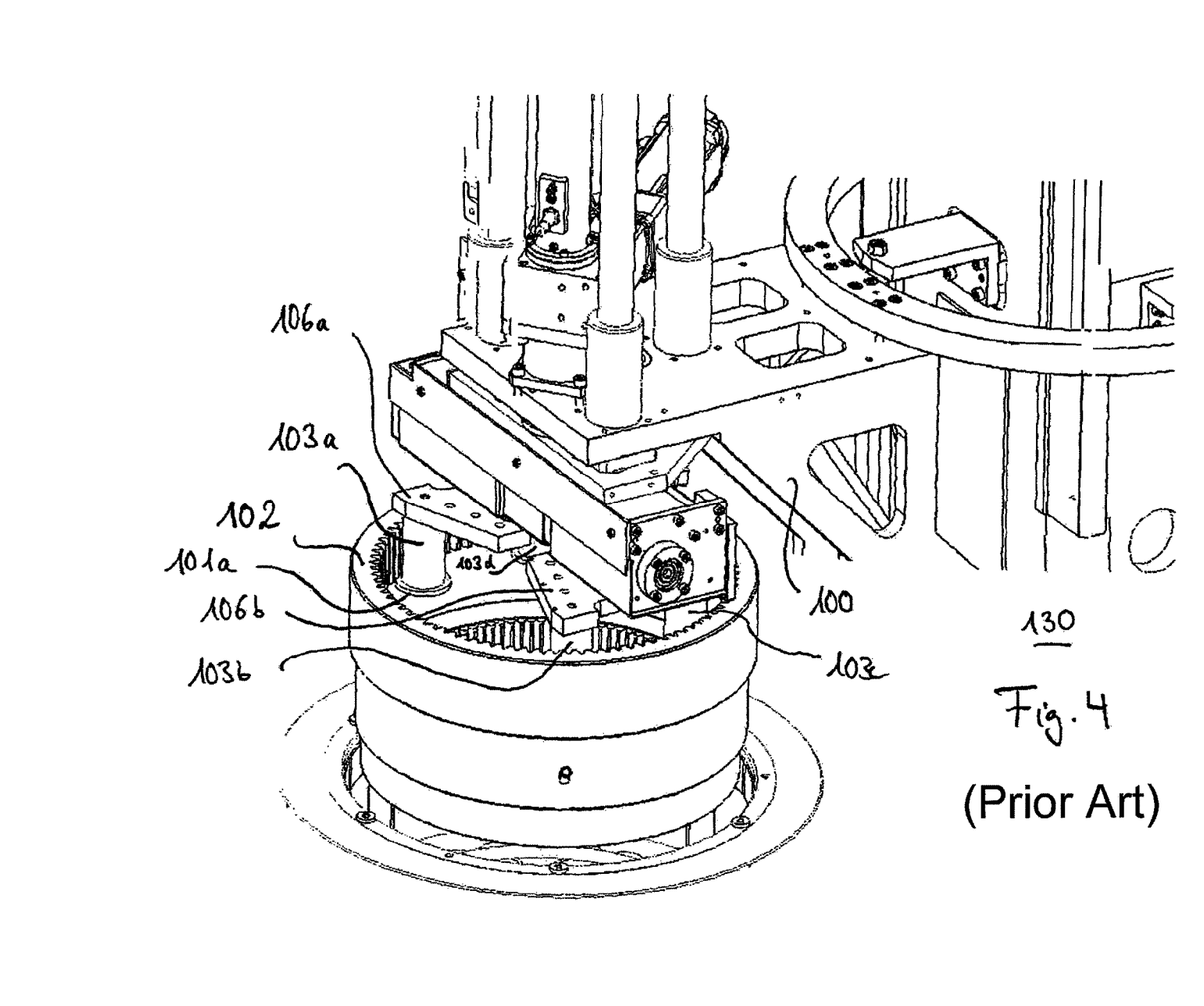
FIG. 4 shows a loading and unloading device that is known from the prior art.

Methods of this kind are of course well known in the art. Since the internally toothed workpieces/workpiece blanks or the workpieces/workpiece blanks that are to be provided with internal toothing, always referred to in a simplified manner in the following as internally toothed workpiece, are clamped from the outside, they are held from the inside by the retaining device during loading and unloading. A loading and unloading device from the prior art that operates in this manner is shown in FIG. 4 and denoted by reference sign 130. Said device comprises a retaining unit 100 that can change positions, by pivoting by 180°, with a diametrically opposed further retaining unit (not shown) in order to bring a workpiece 102 into the clamping position in accordance with the ring loader principle, while the other retaining unit in each case returns a workpiece 102 that has just been cut from the clamping position and transfers it to a workpiece conveyer for example.

The retaining unit 100 comprises four retaining arms 103a, 103b, 103c and 103d, on the free ends of which plate-like retaining regions 101 are formed (retaining region 101a being easiest to identify) on which the workpiece 102 is carried in a supported manner. The retaining arms 103a, 103d are fastened to the crossmember plate 106a relative to which the crossmember plate 106b connected to the retaining arms 103b, 103c can be moved radially with respect to the workpiece axis so that the retaining position shown in FIG. 4 can be assumed in the extended state. By reducing the clearance between the carrier plates 106a and 106b, the retaining contact is released and the retaining unit 100 can enter and leave the or another internally toothed workpiece 102 by means of a vertical movement.

During the workflow, the retaining unit 100 carries out a conveying movement in order to bring a workpiece 102 to be cut into the clamping position. The further retaining unit (not shown) returns the internally toothed workpiece 102 that has just been cut from the clamping position by rotating the ring loader. Subsequently, depending on the direction of rotation of the ring loader, there is a movement of the retaining unit 100 that follows the return movement or follows the reverse conveying movement, until the retaining units are brought into a parked position in the 90° position of the ring loader. The internal toothing of the workpiece 102 clamped into the clamping position is then cut while, on the side of the ring loader not shown in FIG. 4, the workpiece that has been cut and placed on a workpiece conveyor belt for example is moved further on and a workpiece that has not yet been cut is advanced.

If the ring loader principle is not used, loading and unloading can also occur by means of a combination of linear movements instead of a combination of a linear movement and a rotational or pivoting movement.

The manufacturers of gear cutting machines have been approached with a request for the most efficient possible use of the inserts of the gear cutting tools, for example of a gear shaping tool or gear skiving tool for producing internal toothing. However, since the gear cutting tool can only start to cut the toothing when the loading process and the clamping process are complete, in the art rotary holders are increasingly used that carry a plurality of workpiece spindles. The loading and clamping can then occur at one station of the rotary loader, while a workpiece that is clamped in this position but has already progressed by one rotary unit of the rotary carrier can be cut simultaneously by the gear cutting tool. The period of time during which the gear cutting tool cannot operate ("chip to chip" time) is then basically limited to the further cycles of the rotary carrier carrying the workpiece spindles.

The object of the invention is that of more significantly improving a method of the type mentioned at the outset, in particular with the aim of as short a "chip to chip" time as possible, and in particular in a form which is easy to achieve.

This object is achieved by the invention by means of a development of the mentioned method that is basically characterised in that, prior to cutting, the retaining device is permitted to carry out an evasive movement that is different from the return movement/reverse conveying movement and that frees the cutting chamber, or the cutting chamber (U) is already kept free in the loading position assumed by the retaining device (10) in the conveying movement.

The invention thus takes an entirely different path from the current trend towards multi-spindle systems. Instead, the invention is based on the finding that time savings are also achieved in gear cutting machines provided with just one workpiece spindle, simply on account of making use of considerations regarding the relationship between the cutting chamber occupied by the gear cutting tool when cutting the internal toothing and the physical arrangement of the retaining device by means of which the internally toothed workpiece is loaded and unloaded. In the process, the invention also makes use of the finding that, even in the case of comparatively small internally toothed workpieces, despite the space requirement that arises due to the cutting chamber of the gear cutting tool, there is still space remaining inside the internal toothing that is usable and is used by the retaining device in embodiments of the invention.

In this case, the cutting chamber of the gear cutting tool is to be understood as comprising the space required for the desired cutting of the internal toothing, specifically with regard to the space occupied by the cutting tool itself, but also the space required for retaining and positioning said tool.

In contrast to the prior art, in which the retaining device carries out a movement corresponding to the return movement (or a movement corresponding to the reverse conveying movement), in which, following the conveying movement, the retaining device and its retaining arms are first withdrawn parallel to the workpiece axis and then completely pivoted away from the workpiece or moved away in a linear manner, the invention is characterised in one variant by an evasive movement that frees the movement space and that differs from the return movement/reverse conveying movement. In another variant that would correspond to an evasive movement having an imperceptible or negative movement length, such a movement no longer needs to be performed, and the cutting chamber is already free in the loading position assumed by the retaining device during the conveying movement. In each case, the amount of time required between the conveying movement and cutting the workpiece and between the end of the cutting and the return movement is reduced.

Within the scope of the evasive movement according to the invention, it is in principle also possible to still carry out part of the return movement/reverse conveying movement and for the deviation to occur thereafter. In this case, it is preferable for components of the retaining device, in particular the retaining regions thereof and/or carrier regions carrying said retaining regions, to remain at least in part inside the internal toothing during the evasive movement when viewed in a projection on the normal plane of the axis shown. This results, in any case, in a time saving with regard to movement directions that extend transversely to the workpiece axis.

In a further preferred embodiment, it is provided for components of the retaining device, in particular the retaining regions thereof and/or carrier regions carrying said retaining regions, to remain at least in part inside the space enclosed by the internal toothing, in particular also during cutting by means of the gear cutting tool. This also permits a time saving with regard to movements of the retaining devices in parallel with the workpiece axis.

In this embodiment, as in the variant in which the evasive movement is no longer necessary, the space remaining next to the cutting chamber is used for receiving regions of the retaining device.

Irrespective of the type of evasive movement, the invention thus discloses not only a method for loading and unloading an internally toothed workpiece, but also a method for cutting an internally toothed workpiece, in which components of a retaining unit that are used to retain the workpiece while it is being loaded and/or unloaded into/out of its clamping position are received, while the internal toothing is being cut, in a space that is enclosed by the internal toothing and is next to the cutting chamber occupied by the gear cutting tool used during said cutting.

The number of retaining regions required for retaining the workpiece in a stable manner depends inter alia on the orientation in which the axis of the workpiece is to be clamped. In particular, when the workpiece axis is not oriented horizontally, for example when the workpiece axis is oriented vertically, it is preferable for the workpiece to be retained by means of at least two, preferably at least three, in particular three retaining regions of the retaining device.

The evasive movement preferably comprises an individual movement of a retaining region or a plurality of retaining regions relative to another retaining region, in particular of two retaining regions relative to a third retaining region. A third retaining region may for example be arranged at the point of the space enclosed by the internal toothing that is opposite the cutting chamber, such that said retaining region can do without an evasive movement. The cutting chamber can then be freed by an individual movement of one or more, in particular of two, other retaining regions.

In this connection, an individual movement of this kind can take place in the normal plane of the workpiece axis, in particular having components transverse to the radial direction, and can be carried out in particular in the form of a linear movement. The axis of a linear movement of this kind can also extend parallel to the axis of a linear evasive movement of another retaining region.

In a further preferred embodiment, the evasive movement is carried out without any common movement of all of the retaining regions of the retaining device transverse to the workpiece axis, in particular without any common movement. In this connection, a simple movement of the retaining device that releases the retaining contact between the retaining device and the workpiece and does not contribute to freeing the cutting chamber should not be considered an evasive movement either. In particular, in a preferred embodiment according to the invention of the retaining device, in accordance with the ring loader principle, it is thereby possible for another retaining unit of the retaining device that is not currently in use at the clamping position but is instead at another, in particular diametrically opposed, delivery and removal station for the workpieces, to remain in the delivery and removal position with regard to the azimuthal position of the ring loader, and thus for more time to remain for swapping a cut workpiece with a workpiece still to be cut. This can be put to use in simplifications on the delivery and removal side.

As already mentioned, the use of a loading and unloading device that operates according to the ring loader principle is explicitly preferred in the invention. The conveying movement and/or the return movement therefore includes a common movement of all the retaining regions, in particular a rotational movement of a common carrier. In this connection, with regard to the wording of claim 1, it should be noted, as a further explanation, that the term "retaining device" used in said claim can also comprise a plurality of retaining units, of which one retaining unit is used in the conveying movement and another retaining unit is used in the return movement. The term "retaining device" should therefore be interpreted broadly such that a region exerting retaining forces does not need to be physically identical in the conveying movement and the return movement.

It is also provided, within the scope of the invention, for deburring of the workpiece to be carried out prior to the return movement, in particular on the side remote from the gear cutting tool insertion side. In this connection, in a further aspect it is not necessary for the gear cutting tool for cutting the internal toothing to be moved completely or in part out of the space enclosed by the internal toothing. Rather, the deburring tool and gear cutting tool and/or the fixings thereof can be positioned together inside the space enclosed by the internal toothing when deburring occurs. In this connection, it is preferable for the deburring and the cutting of the internal toothing to occur consecutively, a plurality of deburring applications certainly being conceivable while the workpiece is in the clamping position.

This aspect of the invention is also considered to be independently worthy of protection, irrespective of the manner in which the gear cutting tool achieves free access to its cutting chamber. The invention thus considers to be independently worthy of protection and discloses in an independent manner a method for producing or cutting internal toothing of a workpiece, in which deburring of the tooth edges of the internal toothing is carried out in a chronologically staggered manner and which is basically characterised in that the deburring tool and/or the carrier thereof is already located inside the space enclosed by the internal toothing while the internal toothing is being cut, and/or the gear cutting tool that cuts the internal toothing or the carrier thereof is still located inside the space enclosed by the internal toothing during deburring.

Although it would be entirely sufficient, for an evasive movement, to restrict individual movements of retaining regions to movements orthogonal to the workpiece axis, while a release movement for releasing the retaining contacts could occur for example by means of lowering all the retaining regions, an embodiment of the invention provides for at least one retaining region to be movable having movement components that are parallel to the workpiece axis, independently of one or more other retaining regions.

This property can be used advantageously in particular when one retaining region of the retaining device, in particular said independently movable retaining region, is formed by an in particular disc-shaped and in particular rotationally driven deburring tool and/or the carrier thereof. This aspect is based on the further inventive finding that a region of the retaining device of the loading and unloading device can carry out a dual function for deburring or, vice versa, a deburring tool and/or the carrier thereof can be used to retain the workpiece during loading and/or unloading. Then, neither does the retaining device have to carry out separate evasive movements in order to make space for the deburring tool, and nor does this variant contain time-consuming travel paths for the deburring tool.

This aspect of the invention is also to be considered independently worthy of protection, irrespective of the type of toothing to be cut and of the manner in which the cutting chamber is kept free/freed for the gear cutting tool. The invention thus considers to be independently worthy of protection and discloses in an independent manner a method for loading and unloading a toothed workpiece or a workpiece to be provided with toothing in a clamping position, in which position deburring of tooth edges of the toothing is also carried out, in which method the deburring tool and/or the carrier thereof retains the workpiece during loading and/or unloading.

This aspect of the method also discloses a synergistic use of available degrees of freedom of movement. Therefore, a method for cutting, secondary cutting and/or producing toothing, by means of a cutting tool, in a rotating workpiece that is rotatably clamped in a clamping position is further considered independently worthy of protection and is disclosed in an independent manner, in which method the workpiece is brought into the clamping position by means of a conveying movement prior to cutting and is removed from said clamping position by means of a return movement, and in which the cutting tool carries out a positioning movement for cutting, which method is basically characterised in that the conveying and/or return movement has the same degree of freedom of movement as the positioning movement.

The deburring tool itself could of course also be designed in a simpler manner, for example as a deburring blade.

In terms of the method, the invention also discloses a method for cutting and/or producing internal toothing on a workpiece that is clamped in a clamping position, in which method the workpiece is loaded and/or unloaded according to a method of the type described above.

In terms of the device, the invention discloses a loading and unloading device for an internally toothed workpiece or a workpiece that is to be provided with internal toothing, comprising a retaining device that retains the workpiece during a conveying movement that brings the workpiece into a clamping position and a return movement that returns the workpiece from said position, and a control device that controls the movements of the retaining device, which loading and unloading device is basically characterised in that the control device is designed to allow the retaining device to carry out an evasive movement that is different from the return movement/reverse conveying movement and that frees the cutting chamber before internal toothing of the workpiece is cut using a gear cutting tool that occupies a cutting chamber for this purpose, and which control device allows the retaining device to carry out this evasive movement by outputting control commands, or is designed to permit the gear cutting tool to be positioned into the position assumed during cutting of the internal toothing, without a previous movement of the retaining device after the conveying movement that goes beyond releasing the retaining contact.

The advantages of the loading and unloading device according to the invention can be found in the abovementioned advantages of the method according to the invention.

In this connection, the loading and unloading device/the control device thereof is further designed to carry out a method according to any of the further method aspects described.

The retaining device can thus comprise one or more retaining units that can retain the workpiece. In particular, a loading and unloading device of the ring loader type is provided, comprising at least two retaining units.

The retaining units can be movable independently of one another. It is provided in particular for one retaining unit to be movable independently of another retaining unit of the retaining device, in particular in a movement direction having direction components that extend in parallel with the workpiece axis of the clamped workpiece, preferably parallel to the workpiece axis.

It is further preferably provided for a retaining unit to comprise two or more retaining arms, preferably three or more, in particular three, of which arms preferably one, in particular two, is/are movable in particular in a common movement axis, in particular the third, preferably having movement components that are transverse to the workpiece axis, in particular orthogonal thereto.

Expediently, however, one retaining arm can be independently movable relative to at least one other retaining arm in a movement direction having components that are parallel to the workpiece axis, in particular parallel thereto.

In particular, this independently movable retaining arm can be provided as a carrier for an in particular rotationally driven deburring tool, it also being possible for the deburring tool itself to be provided to exert a retaining force.

In the variant without an evasive movement, the retaining unit can, in a retaining position, provide three point support that is produced by said unit in a manner that is azimuthal relative to the retaining arms thereof in a support region that extends over a large region, and in particular in a pivoting position facilitates extension of the retaining unit out of the internal toothing (e.g. after having been placed in the removal position).

In a further preferred embodiment, retaining is achieved by clamping forces that are in particular parallel to the workpiece axis, for example by means of a clamping jaw. In this connection, the azimuthal space requirement for the retaining unit can be less than 180°, in particular less than 150°, or even less than 120°.

Furthermore, in terms of the device, a gear cutting machine is protected that comprises a loading and unloading device of this kind. The gear cutting machine is preferably a gear skiving machine or a gear shaper, in particular a gear skiving machine.

Further details, features and advantages of the invention can be found in the following description with reference to the accompanying drawings, in which.

Figure 1:
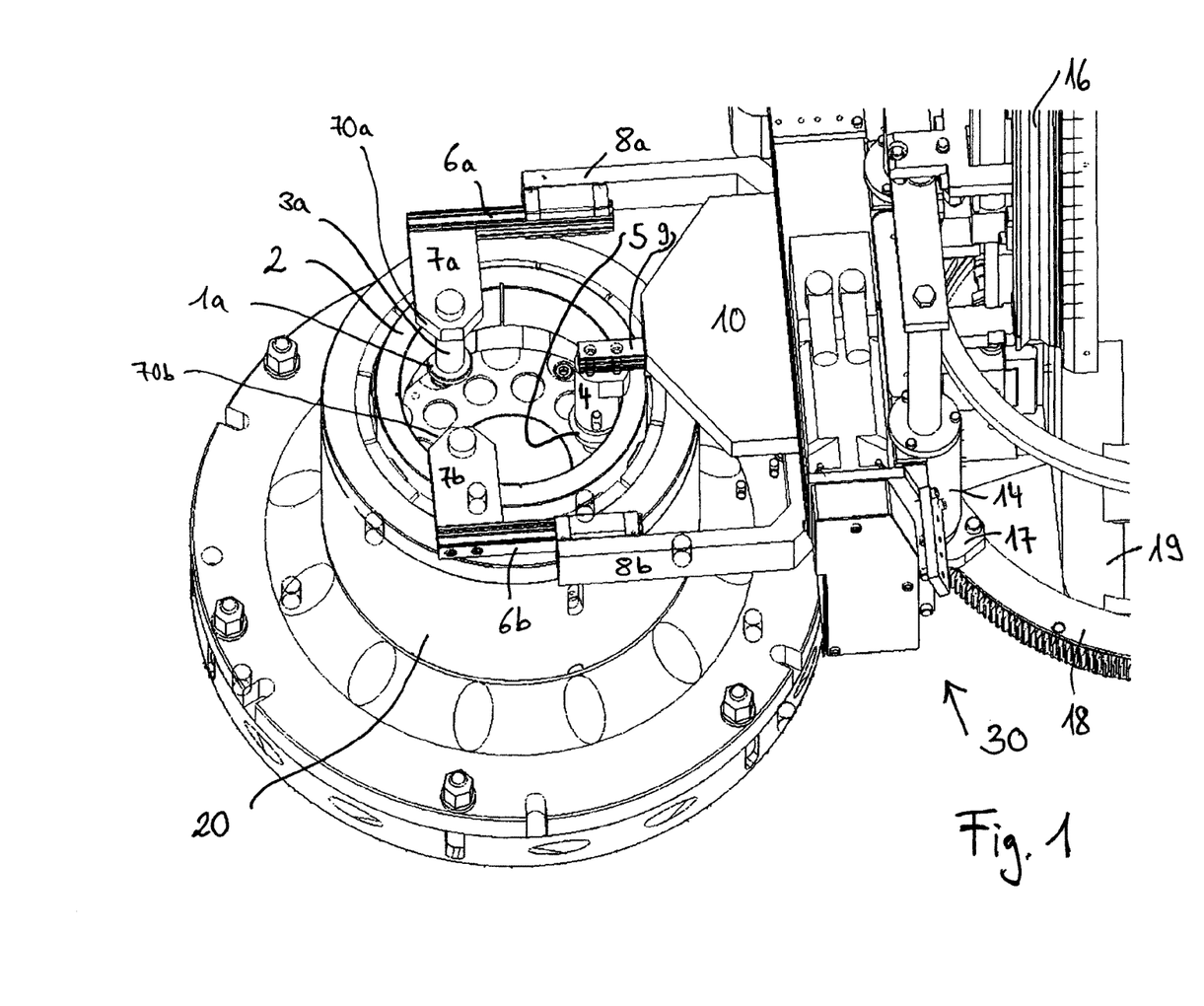
FIG. 1 shows a loading and unloading device according to the invention in a loading/unloading position.

FIG. 1 is a perspective view of a detail of a loading and unloading device 30. In this embodiment, said device is used to receive workpiece blanks from a receiving position (not shown) and bring said blanks into a clamping position defined by a clamping device 20, in which clamping position internal toothing is produced on the workpiece 2, for example in a gear skiving method or by means of a gear shaper. In this embodiment, a basic structure of the loading and unloading device 30 corresponds to a conventional ring loader system, in which a circumferential ring 18 can be rotated about a columnar support 19 of the loading and unloading device 30 in order to be able to be moved between the clamping position and a delivery and removal station (not shown) by rotating azimuthally by 180° for example.

Although this is not shown in FIG. 1, a further retaining unit is attached to the circumferential ring 18 opposite to the first retaining unit 10. Thus, while the retaining unit 10 performs a return movement of a workpiece 2 in which internal toothing has already been produced, the other retaining unit can simultaneously bring a subsequent workpiece blank 2 into the clamping position by means of a conveying movement.

In the embodiment shown, the workpiece 2 is clamped having a vertically extending workpiece axis and is lowered into the workpiece clamp 20 during the conveying movement. The vertical movement of the retaining unit 10 required for this purpose is achieved by means of a vertical rail 16, along which the movement is carried out. In the process, bearing bushes 14 move relative to guide pillars that are fixed to the circumferential ring 18 by means of a mounting plate 17.

The annular workpiece 2 is retained by means of the clamping from the outside and by means of retention from the inside. For this purpose, three retaining arms 3a, 3b and 4 are provided in this embodiment, at the remote ends of which arms support regions 1a, 1b and 5, respectively, are arranged in this embodiment, on which regions the workpiece 2 is supported during the conveying and return movement.

In the loading and unloading position, the retaining arms 3a, 3b and 4 assume the form of a triangle that permits tilt-free mounting/fixing of the workpiece 2. However, other variants are also conceivable for stable fixing of this kind in the case of retention of the workpiece 2 that is based on making use of the weight.

The retaining arms 3a, 3b and 4 are coupled to the retaining unit 10 in the following manner. Laterally protruding carriers 8a, 8b, the mutual clearance of which in this embodiment is greater than the internal diameter of the workpiece 2, carry a fixing at the mutually facing sides of their free ends, in which slide rails 6a, 6b are guided so as to be linearly movable. Crossmembers 7a, 7b protrude inwardly at the free ends of the slide rails 6a, 6b, respectively, at the free ends of which crossmembers the retaining arms 3a, 3b, respectively, are fixed, which arms extend parallel to the workpiece axis of the workpiece 2 to be retained. A carrier arm 9 is arranged centrally between the carriers 8a, 8b, which arm carries the third retaining arm 4 comprising the support region 5. An additional function of this third arm will be described below.

It can be seen in FIG. 1 that the space between the triangularly arranged retaining arms 3a, 3b and 4 is kept free. In this free space, the retaining arms 3a, 3b can now be moved inwards by means of an adjustment movement of the carrier rails 6a, 6b, and can thereby create or increase a free space on the side of the annular space enclosed by the workpiece 2 that is opposite the position of the third arm 4.

FIG. 2a shows the position assumed by the retaining unit 10 in which the carrier rails 6a, 6b are retracted. The free space thus created is sufficient for the cutting chamber occupied by the cutting tool T when cutting the internal toothing of the workpiece 2. FIG. 2b shows the situation again, the cutting tool T being shown in addition, which tool is a gear skiving tool in this embodiment and is shown together with a clamping region of the tool spindle. The adjustment movement of the carrier rails 6a, 6b is thus an evasive movement that frees the cutting chamber of the gear cutting tool.

For the purpose of the following description of the entire process of loading, workpiece cutting and unloading, it is assumed in the following, in a simplified manner, that the retaining unit 10 is the only retaining unit of the loading and unloading device 30.

Proceeding from a situation in which the retaining unit 10 does not carry a workpiece 2, said unit is brought into the delivery and removal station (not shown) by means of azimuthal rotation of the ring 18. In this position, the retaining unit 10 is lowered into the interior of a workpiece blank 2 by means of a vertical movement along the rail 16 when the carrier rails 6a, 6b are (at least in part) retracted, until the support regions 1a, 1 b and 5 come to rest at the level of or below the downwardly pointing end faces of the workpiece 2. Subsequently, the triangular arrangement of the retaining arms 3a, 3b and 4 is achieved by means of an evasive movement of the carrier rails 6a, 6b, which arrangement provides tilt-free, stable fixing of the workpiece blank 2.

Figure 3:
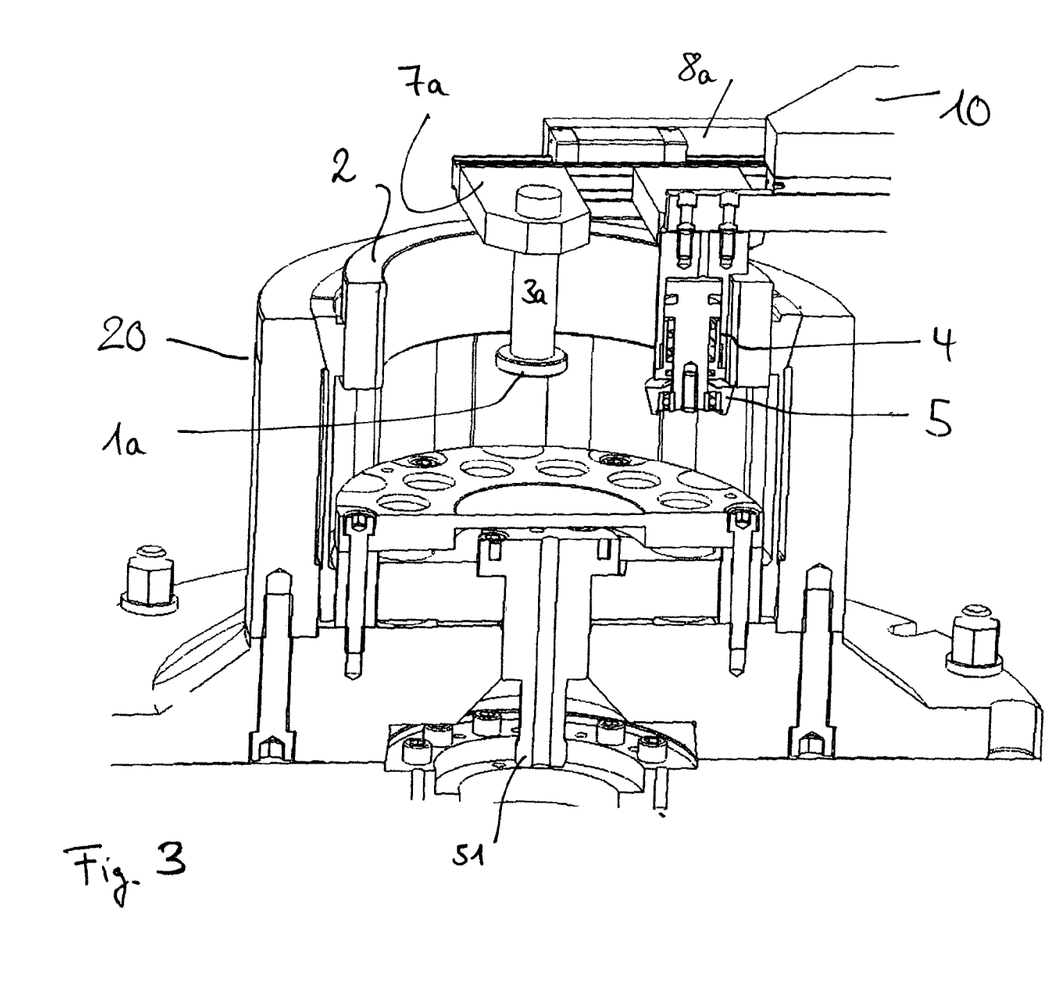
FIG. 3 is a partial sectional view in which a deburring tool of the loading and unloading device is positioned in the working position.

In this loading and unloading position, the workpiece blank 2 is then raised, if necessary, from its delivery position and the workpiece blank 2 is azimuthally positioned into the clamping position by pivoting the retaining unit 10, which clamping position is assumed by lowering the retaining unit 10 into the clamp 20. The situation shown in FIG. 1 is thus achieved, and the workpiece 2 to be cut is clamped in the clamp 20 in the conventional manner, for example by means of actuating the tension rod 51 shown in FIG. 3.

Figure 2:
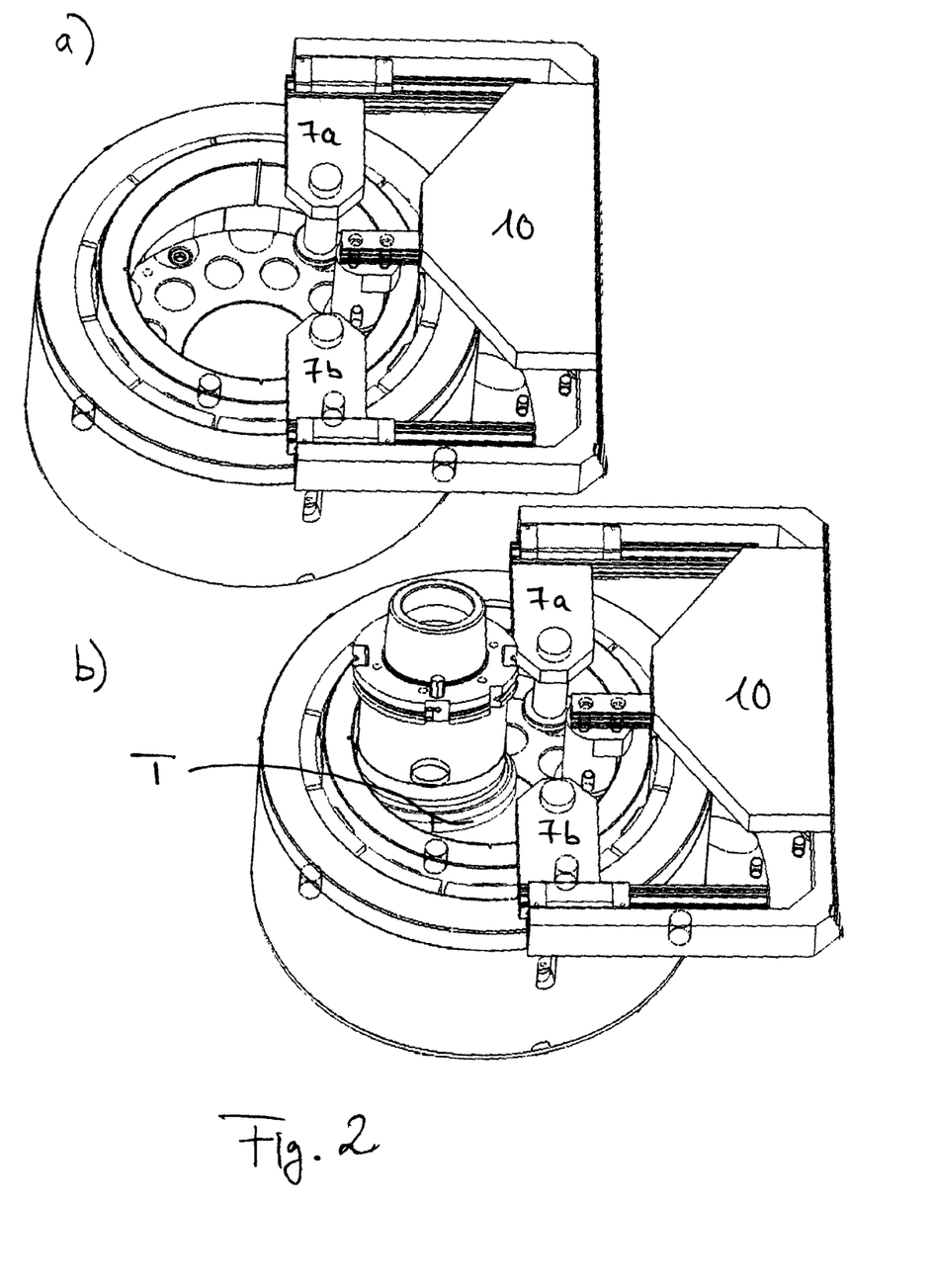
FIG. 2 is a detail of the loading and unloading device in a cutting position, FIG. 2a showing the free state of the cutting chamber that is occupied by a gear cutting tool in FIG. 2b.

At this time, or immediately after the placement of the workpiece (and before clamping), the evasive movement that frees the cutting chamber for the gear cutting tool can occur, as described above, by means of an adjustment movement and retraction of the carrier rails 6a, 6b in order to reach the standby position of the retaining unit 10 shown in FIG. 2. For cutting the workpiece 2, which, in this embodiment, constitutes producing internal toothing by means of the gear skiving tool T, at least some of the existing retaining contacts are released preferably before, during or after the evasive movement, for example by vertically lowering the retaining unit 10 as a whole, in order not to produce any undesired contact during the workpiece rotation carried out when cutting the internal toothing.

As can be seen in FIG. 2, as a result of the evasive movement of the retaining unit 10, not only does the cutting chamber occupied by the gear cutting tool T remain free, but this space is also free of components of the retaining unit when viewed in a projection on the normal plane of the workpiece axis, although in this embodiment said retaining unit is still located inside the region enclosed by the internal toothing of the workpiece. It is thus possible to significantly reduce the time between completion of cutting the toothing and the return to the loading and unloading position of the retaining unit 10 compared with the prior art, in which the evasive movement follows the return movement (or the reverse conveying movement) in that the retaining arms (optionally after simply releasing the retaining contact thereof) are raised together from the space enclosed by the workpiece by lifting the retaining unit in parallel with the workpiece axis, and said arms can be moved into a parked position on the conveying path/return path, for example by pivoting, so that it is possible for the toothing to be cut.

According to a further aspect, the retaining unit 10 has a further function of cutting the workpiece 2. For this purpose, in this embodiment, the third retaining arm 4 is formed as a carrier of a deburring tool 5 that, in this embodiment, forms the support region for the workpiece 2. As can be seen most clearly in FIG. 3, the deburring tool 5 is a disc-shaped deburring tool that is mounted for conjoint rotation, the mounting of which is provided in the retaining arm 4. As can be seen in FIG. 2, the deburring arrangement is thus arranged simultaneously with the gear cutting tool T in the space enclosed by the internal toothing, with the result that it is possible to switch between cutting internal toothing and deburring the burrs that occur on the tooth edges in the process with only very short tool movements. It is in principle conceivable, for example, for deburring to even occur in parallel with cutting/producing the internal toothing, but a sequential operation is preferred, in which either the gear cutting tool T fully produces the internal toothing and the deburring tool 5 subsequently performs deburring, or deburring occurs in between for example, while the gear cutting tool T is withdrawn for a subsequent cutting procedure. Combinations of these variants are also conceivable.

For this purpose, in this embodiment, the carrier rail 9 can be adjusted relative to the retaining unit 10 in parallel with the workpiece axis, and can thus bring the deburring tool 5 into and out of contact with the end face to be deburred of the internally toothed workpiece 2. In addition, the carrier rail 9 is also axially adjustable so as to be able to bring the retaining arm 4 and support region 5 into/out of retaining contact for retaining the workpiece 2 by means of a movement that is perpendicular to the workpiece axis.

In the embodiment shown, the workpiece is clamped having a vertical workpiece axis, but the invention is not restricted to an arrangement of this kind. For example, horizontal clamping of the workpiece could also be provided, but in principle also any desired workpiece orientation. Expediently, the workpiece 2 is then no longer retained by support regions, but rather by radial retaining forces exerted by the retaining arms 3a, 3b and 4.

Figure 5A:
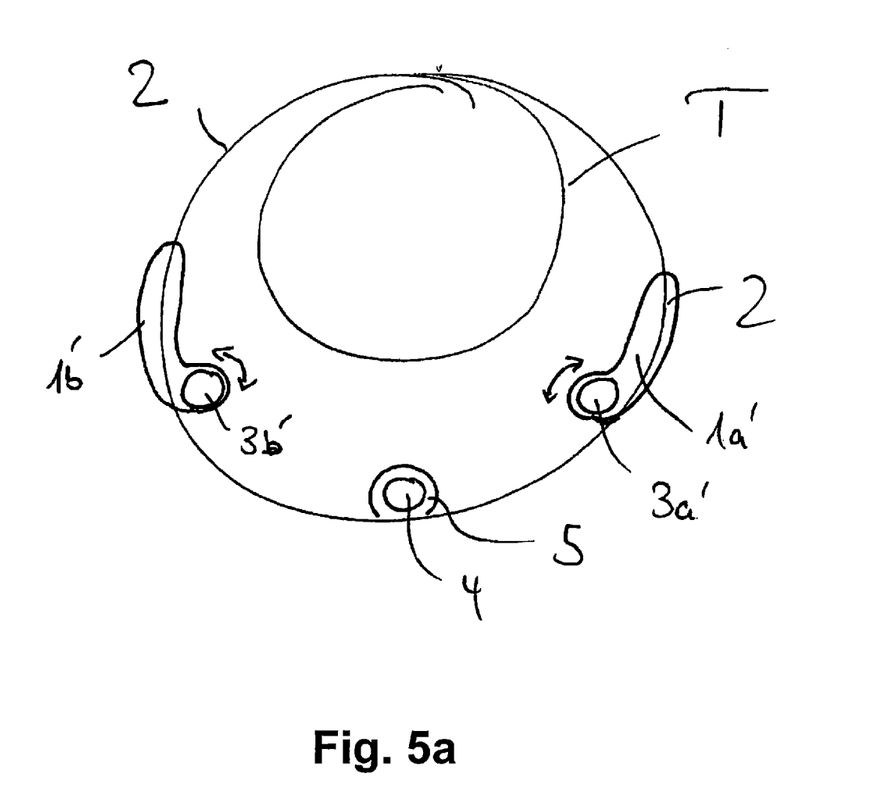
FIG. 5a is a schematic view of an arrangement of retaining arms and support regions attached opposite thereto.

In an alternative embodiment, the fundamental spatial arrangement shown in FIG. 2b, which permits internal toothing to be cut, is also assumed by the retaining unit in the loading position with regard to the arrangement of said retaining unit (FIG. 2a). This could be achieved in that the dimensioning of the workpiece 2 to be cut and the gear cutting tool T for example already permits stable three point fixing, such that the azimuthal clearance extending over the third retaining arm 5 between the retaining arms 3a and 3b reaches or exceeds 180° (not shown in FIG. 2a). In this case, the internal toothing can be cut immediately after the loading and, if necessary, releasing of the retaining contacts has been carried out. In an alternative embodiment, shown in FIG. 5a, in which the loading position of the retaining unit 10 corresponds to that of FIG. 2a, i.e. having an azimuthal clearance of less than 180°, this can be compensated by elongate extensions of the support regions 1a, 1b that then ensure the stable, tilt-free fixing in terms of extension. In order to be inserted into a workpiece or workpiece blank to be retained for the first time, the retaining arms 3a, 3b can be arranged so as to be rotationally adjustable relative to the crossmembers 7a, 7b, respectively, thereof, such that the elongate extensions of the retaining regions can be rotated in the interior of the toothing by rotating the retaining arms when viewed in a projection on the normal plane to the workpiece axis, and optionally after an additional evasive movement of the carrier rails 6a, 6b can be raised out of or lowered into the interior of the workpiece unhindered (FIG. 5a).

Therefore, an evasive movement is no longer required in this variant. However, the solution described in FIG. 1 permits improved rigidity for the loading and unloading irrespective of possibly more favourable dimensioning of the tool and workpiece, and the evasive movement can be tolerated for this.

Figure 5B:
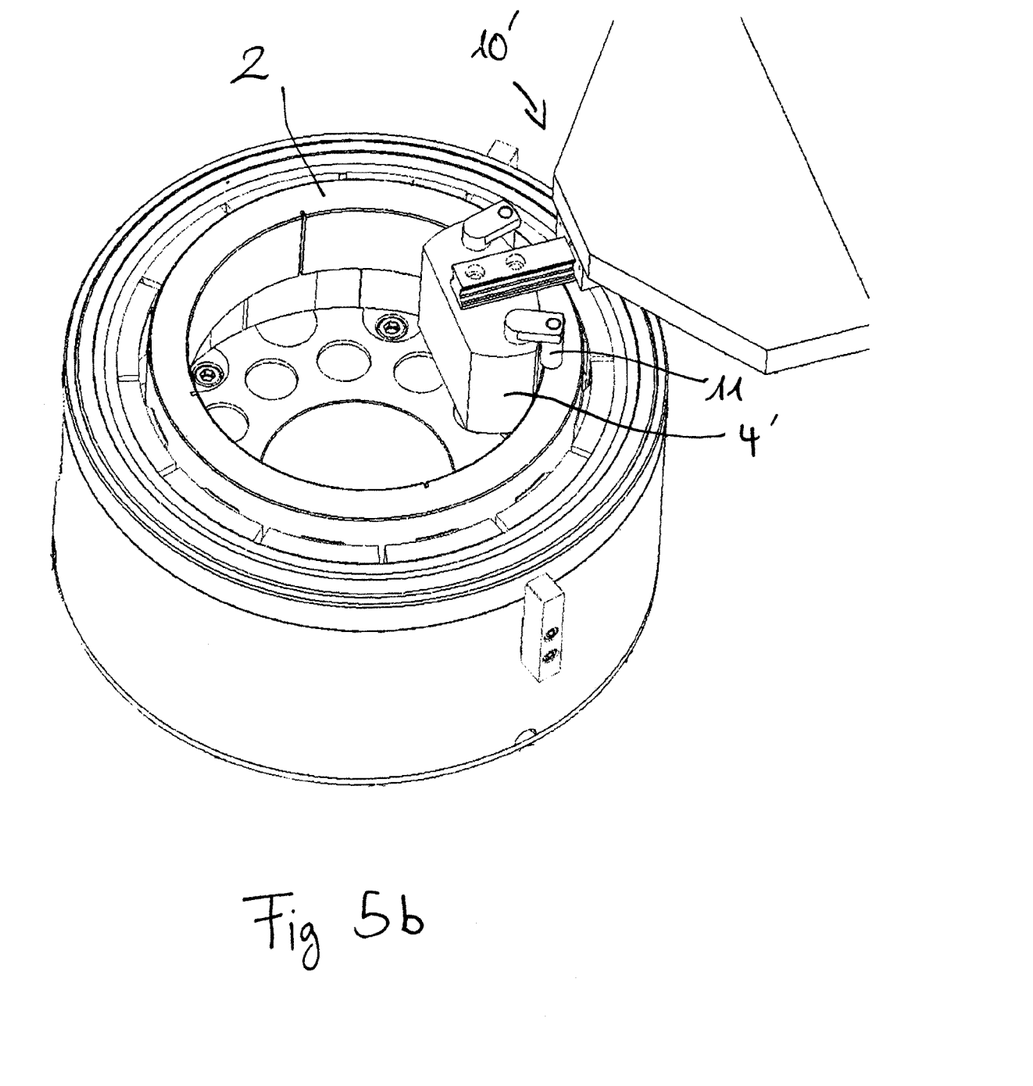
FIGS. 5b and 5c are perspective views of a further retaining unit.
Figure 5C:
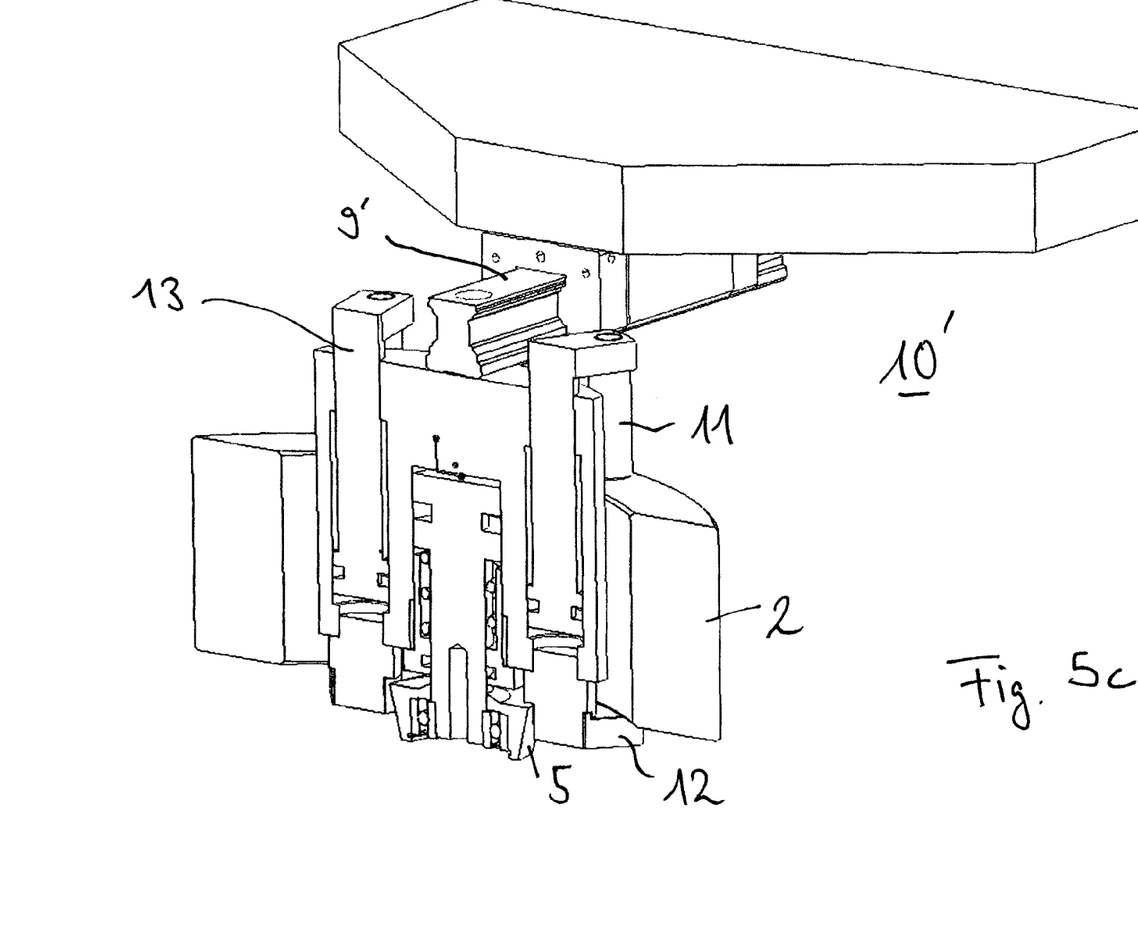

FIGS. 5b and 5c show a further embodiment of the invention that is based on the variant without an evasive movement. In this case, a retaining unit 10' comprises a clamping jaw 4' that is mounted so as to be radially displaceable across a rail 9' and in which inverted L-shaped carriers 13 are mounted that can be displaced parallel to the workpiece axis and on the free ends of which clamping pins 11 exert an axial clamping force on the workpiece 2 by interacting with the mating parts 12. The workpiece 2 is therefore clamped at the end faces thereof by actuating the clamping jaw 4' and can be transported for loading and unloading, the retaining grip occurring on the inside.

However, as can be seen most clearly in FIG. 5b, there is still sufficient free space provided in the interior of the internally toothed workpiece 2 for positioning the tool for cutting the internal toothing and for carrying out this cutting. Prior to cutting, the clamping retaining force is released but no further movement of the clamping jaw 4' is required. Correspondingly, after cutting of the internal toothing has been completed, by actuating the clamping jaw 4', the tool for cutting the internal toothing can be grasped and can be unloaded after the workpiece clamp has been released without requiring a long travel path.

In a manner similar to the embodiment already described above, in this embodiment, too, a deburring tool 5 can be provided that is mounted in the clamping jaw 4' so as to rotate conjointly with the internally toothed workpiece 2 upon rotation of said workpiece when in engagement for cutting.

Figure 6A:
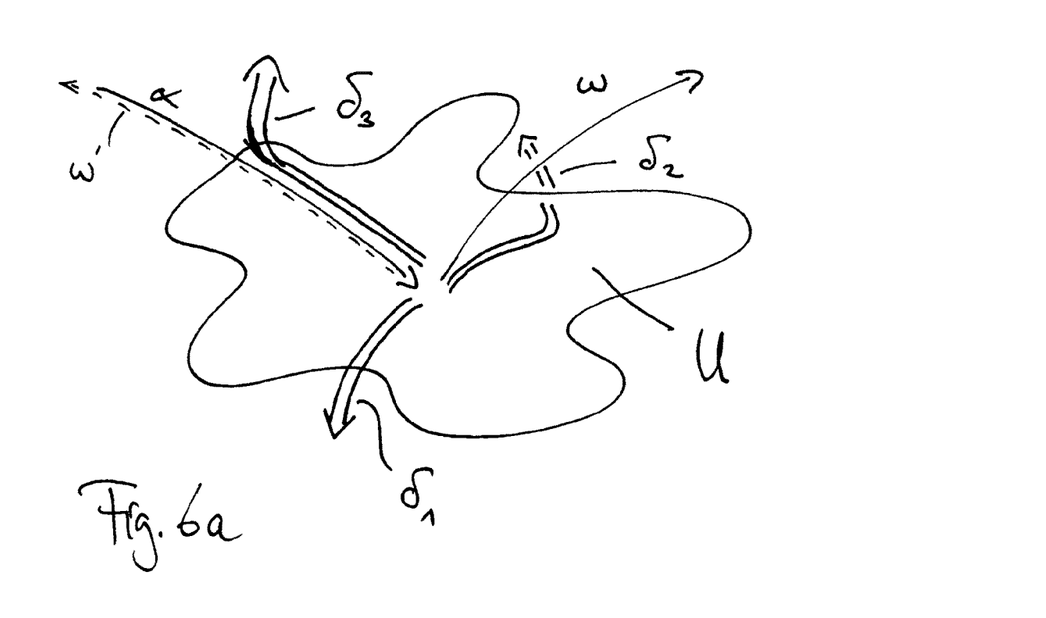
FIG. 6 is an abstract depiction of the inventive concept.

FIG. 6a is an abstract depiction of three possible evasive movements $\delta 1$, $\delta 2$, $\delta 3$ out of the cutting chamber U, in which a retaining unit is caused to move in the conveying movement $\alpha$, and two variants $\omega$, $\omega 1$ for the return movement.

Figure 6B:
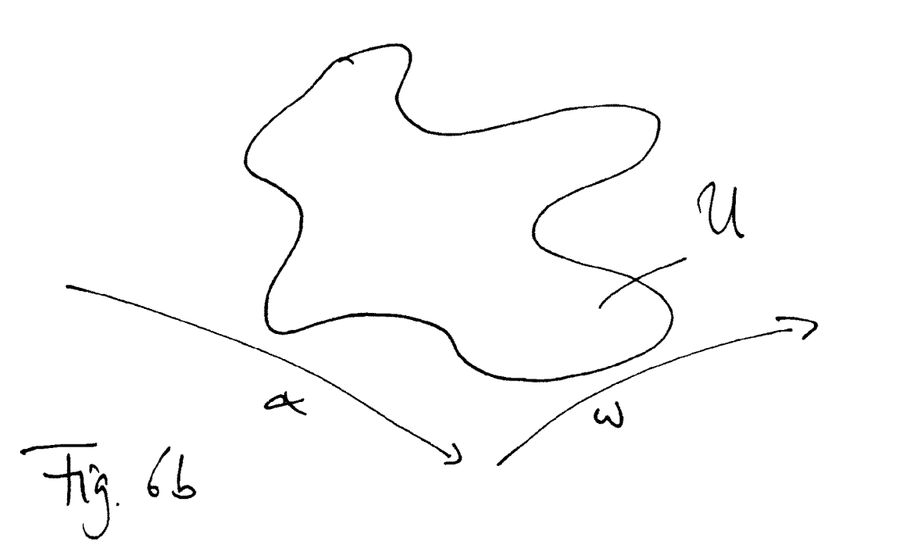

FIG. 6b is an abstract depiction of the alternative in which an evasive movement is no longer required.

The invention claimed is:

1. Method for loading and unloading an internally toothed workpiece (2) having an axis of rotation into or out of a clamping position, said workpiece having an annular space enclosed by said workpiece, wherein the workpiece (2), which is held by a retaining device comprising at least two retaining regions, is brought from a receiving position into the clamping position by means of a conveying movement ($\alpha$) so that said workpiece, when clamped, has internal toothing cut by a gear cutting tool (T) that occupies a cutting chamber (U) and, after the cutting, said workpiece, which is held by the retaining device, is returned from the clamping position to a delivery position in a return movement (ω), characterised in that, prior to the cutting, at least one of the retaining regions of the retaining device (10) carries out an evasive movement (δ) that is different from the return movement (ω) or that is different from a reverse conveying movement (−α), said evasive movement providing a free space within said annular space enclosed by said workpiece, said cutting chamber being located in said free space.

2. Method according to claim 1, wherein the retaining device comprises components, the components of the retaining device comprising: (i) the retaining regions (1*a*, 1 *b*, 5) and/or (ii) carrier regions (3*a*, 3*b*, 4) carrying said retaining regions, and wherein the components remain at least in part inside the internal toothing during the evasive movement (δ) when viewed in a projection on a plane normal to the workpiece axis of rotation.

3. Method according to claim 2, wherein the components of the retaining device remain at least in part inside the annular space during the cutting by means of the gear cutting tool (T).

4. Method according to claim 1, wherein the evasive movement comprises: (i) an individual movement of one of the retaining regions or (ii) movement of each of a plurality of the retaining regions relative to another retaining region.

5. Method according to claim 4, wherein the individual movement takes place in a plane normal to the workpiece axis of rotation, and is in the form of a linear movement.

6. Method according to claim 1 wherein the evasive movement (δ) is carried out without any common movement of all of the retaining regions of the retaining device transversely to the workpiece axis.

7. Method according to claim 1 wherein the conveying movement and/or the return movement includes a common movement of all the retaining regions including a rotational movement of a common carrier (10).

8. Method according to claim 1 wherein deburring of the workpiece is carried out on a side of the workpiece remote from the gear cutting tool via a deburring tool prior to the return movement.

9. Method according to claim 8, wherein the deburring and the cutting of the internal toothing occur simultaneously or consecutively at least in part, the deburring tool (5) and gear cutting tool (T) being positioned together inside the annular space enclosed by the internal toothing.

10. Method according to claim 1 wherein at least one of the retaining regions (4, 5) is movable parallel to the workpiece axis of rotation, independently of one or more other retaining regions (1, 3).

11. Method according to claim 1 wherein one of the retaining regions of the retaining device is formed by a disc-shaped and rotationally driven deburring tool (5) and/or a carrier (4) of the deburring tool.

* * * * *